US012747960B2

(12) United States Patent
Muto et al.

(10) Patent No.: US 12,747,960 B2
(45) Date of Patent: Sep. 29, 2026

(54) MAP UPDATE SYSTEM, MAP UPDATE APPARATUS, AND STORAGE MEDIUM

(71) Applicant: DENSO CORPORATION, Kariya-city (JP)

(72) Inventors: Shigehiro Muto, Kariya-city (JP); Tomoo Nomura, Kariya-city (JP); Toshio Nomura, Kariya-city (JP); Satoshi Horihata, Kariya-city (JP); Hirohisa Watanabe, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 65 days.

(21) Appl. No.: 18/525,674

(22) Filed: Nov. 30, 2023

(65) Prior Publication Data

US 2024/0102823 A1 Mar. 28, 2024

Related U.S. Application Data

(63) Continuation of application No. PCT/JP2022/019682, filed on May 9, 2022.

(30) Foreign Application Priority Data

Jun. 3, 2021 (JP) ................................ 2021-093643

(51) Int. Cl.

*G01C 21/00* (2006.01)
*G06T 5/70* (2024.01)
*G06V 20/56* (2022.01)

(52) U.S. Cl.

CPC ..... *G01C 21/3815* (2020.08); *G01C 21/3837* (2020.08); *G06T 5/70* (2024.01); *G06V 20/588* (2022.01); *G06T 2207/30256* (2013.01)

(58) Field of Classification Search

CPC ........... G01C 21/3815; G01C 21/3837; G06V 20/588; G06T 2207/30256

See application file for complete search history.

(56) References Cited

U.S. PATENT DOCUMENTS

| | | | | |
|---|---|---|---|---|
| 8,004,428 B2 * | 8/2011 | Koenig | B62D 15/029 340/988 |
| 2013/0169794 A1 * | 7/2013 | Shimomura | E01C 23/01 348/128 |

(Continued)

FOREIGN PATENT DOCUMENTS

| | | | | |
|---|---|---|---|---|
| JP | 2008070206 A | 3/2008 | |
| JP | 2020-144226 A | 9/2020 | |
| KR | 20200005818 A * | 1/2020 | G06T 15/10 |

OTHER PUBLICATIONS

KR 20200005818 A—machine translation (Year: 2020).*

*Primary Examiner* — Dino Kujundzic
(74) *Attorney, Agent, or Firm* — Precision Patents, P.C.

(57) ABSTRACT

A map update system includes a map data storage unit storing therein map data. The map update system acquires a position of a road marking painted on a surface of a road. The map update system acquires a determination value to be subjected to determination of blurring of the road marking based on at least either of measurement information on the road marking and analysis information analyzing the measurement information. The map update system compares the determination value to a reference value and acquires blur information indicating a degree of blurring of the road marking. The map update system reflects the blur information in the map data.

20 Claims, 11 Drawing Sheets

(56) References Cited

U.S. PATENT DOCUMENTS

| | | | | |
|---|---|---|---|---|
| 2015/0371094 | A1* | 12/2015 | Gardiner | G01S 19/13 348/148 |
| 2017/0122749 | A1* | 5/2017 | Urano | G01S 19/42 |
| 2017/0177951 | A1* | 6/2017 | Yang | G06T 7/11 |
| 2018/0151066 | A1* | 5/2018 | Oba | G05D 1/247 |
| 2018/0373941 | A1* | 12/2018 | Kwant | G08G 1/0145 |
| 2020/0080945 | A1* | 3/2020 | Iwai | G01N 21/95607 |
| 2020/0294221 | A1* | 9/2020 | Oe | G06V 20/588 |
| 2020/0317201 | A1 | 10/2020 | Takemura et al. | |
| 2021/0331703 | A1* | 10/2021 | Duan | G05D 1/65 |
| 2022/0306150 | A1* | 9/2022 | Inoue | B60W 40/072 |
| 2022/0383646 | A1* | 12/2022 | Hosoya | G06T 7/70 |
| 2022/0412772 | A1* | 12/2022 | Rabani | G06V 20/588 |
| 2023/0026281 | A1 | 1/2023 | Takemura et al. | |
| 2023/0148097 | A1* | 5/2023 | Miyake | G01S 13/867 348/148 |

* cited by examiner

MAP UPDATE SYSTEM, MAP UPDATE APPARATUS, AND STORAGE MEDIUM

CROSS-REFERENCE TO RELATED APPLICATION

The present application is a continuation application of International Application No. PCT/JP2022/019682, filed on May 9, 2022, which claims priority to Japanese Patent Application No. 2021-093643, filed on Jun. 3, 2021. The contents of these applications are incorporated herein by reference in their entirety.

BACKGROUND

The present disclosure relates to a map update system, a map update apparatus, and a storage medium. A method for updating map data is known. In the method, new and old point group data are compared, and changed points are detected.

SUMMARY

An aspect of the present disclosure provides a map update system that includes a map data storage unit storing therein map data. The map update system acquires a position of a road marking painted on a surface of a road. The map update system acquires a determination value to be subjected to determination of blurring of the road marking based on at least either of measurement information on the road marking and analysis information analyzing the measurement information. The map update system compares the determination value to a reference value and acquires blur information indicating a degree of blurring of the road marking. The map update system reflects the blur information in the map data.

DESCRIPTION OF THE EMBODIMENTS

Figure 1:
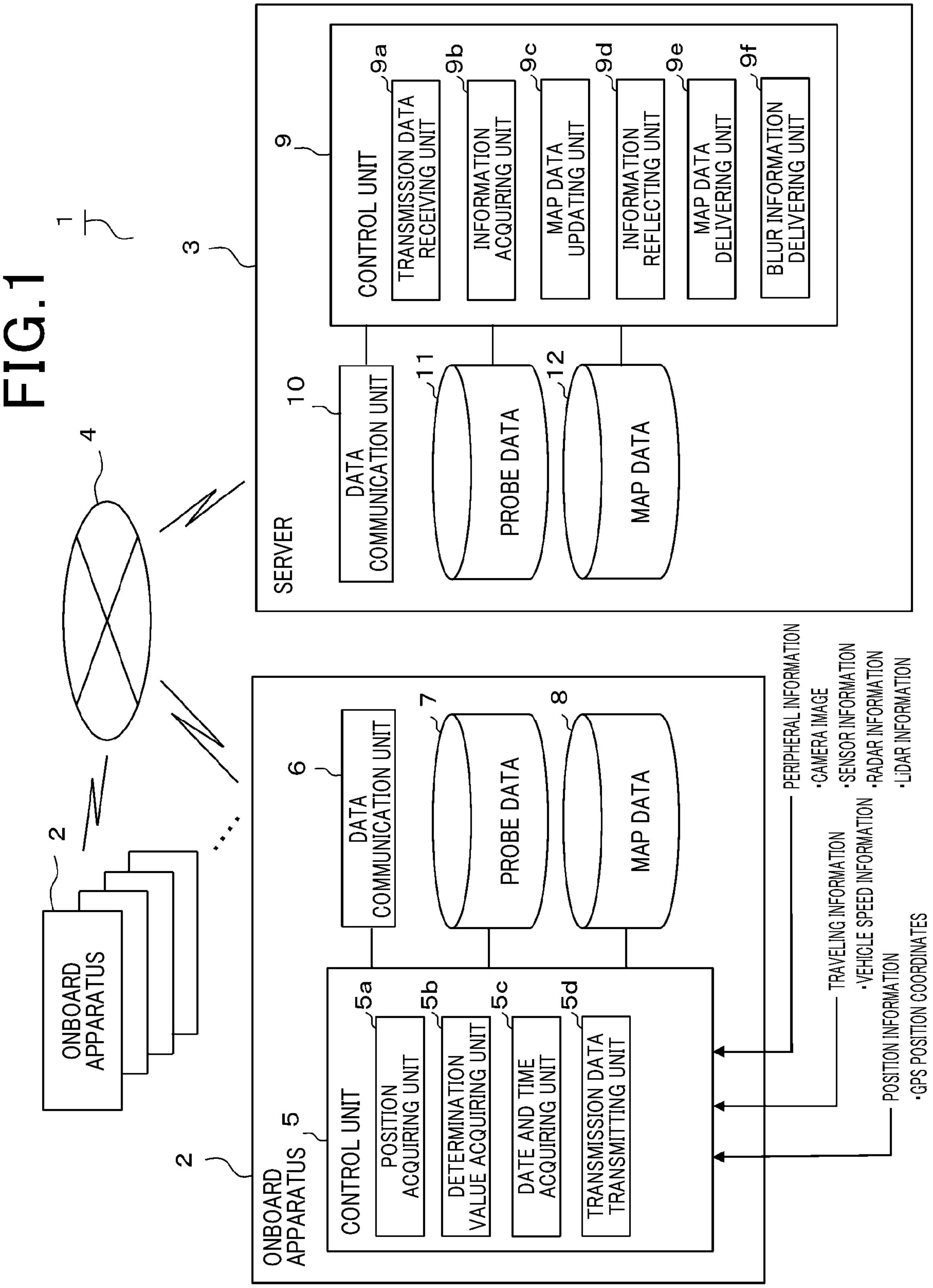
FIG. 1 is a functional block diagram illustrating an overall configuration of a map update system according to a first embodiment.

As a method for updating map data, a method in which new and old point group data are compared, and changed points are detected is known. For example, in a method described in JP 2020-144226 A, a foundational point group indicating a three-dimensional coordinate value of each point measured by a first measurement system and a reference point group indicating the three-dimensional coordinate value of each point measured by a second measurement system having lower measurement accuracy than the first measurement system are compared. A difference between the foundational point group and the reference point group is extracted as a change point group. Foundational point group data indicating the foundational point group is updated based on the change point group.

Road markings such as boundary lines are painted on the surfaces of roads. A road marking may become blurred over time. If an onboard apparatus is unable to recognize the road marking, driving assistance, such as autonomous driving, can no longer be appropriately performed. Due to such circumstances, the blurring of road markings is required to be reflected in map data. However, JP 2020-144226 A does not take into consideration the blurring of road markings.

It is thus desired to appropriately reflect blurring of road markings painted on surfaces of roads in map data.

An exemplary embodiment of the present disclosure provides a map update system that includes a map data storage unit storing therein map data. The map update system includes: a position acquiring unit that acquires a position of a road marking painted on a surface of a road; a determination value acquiring unit that acquires a determination value to be subjected to determination of blurring of the road marking based on at least either of measurement information on the road marking and analysis information analyzing the measurement information; an information acquiring unit that compares the determination value to a reference value and acquires blur information indicating a degree of blurring of the road marking; and an information reflecting unit that reflects the blur information in the map data. The information reflecting unit reflects the blur information in the map data by setting a virtual indicator in an area in which the road marking is blurred.

A determination value that is subjected to determination of blurring of a road marking painted on a surface of a road is compared to a reference value. Blur information indicating a degree of blurring of the road marking is acquired. The acquired blur information is reflected in map information by setting a virtual indicator in an area in which the road marking is blurred. The blurring of a road marking painted on the surface of a road can be appropriately reflected in the map data.

The present disclosure will be further clarified through the detailed description below, with reference to the accompanying drawings.

Some embodiments will hereinafter be described with reference to the drawings. Sections according to the embodiments below corresponding to descriptions according to preceding embodiments are given the same reference numbers. Redundant descriptions may be omitted.

First Embodiment

A first embodiment will be described with reference to FIG. 1 to FIG. 10.

As shown in FIG. 1, a map update system 1 is configured such that an onboard apparatus 2 that is mounted in a vehicle and a server 3 that is disposed on a network side are capable of performing data communication over a communication network including, for example, the Internet. The server 3 corresponds to a map update apparatus. The vehicle in which the onboard apparatus 2 is mounted may be a vehicle that is provided with an autonomous driving function or a vehicle that is not provided with an autonomous driving function. The vehicle that is provided with an autonomous driving function travels by successively switching between autonomous driving and manual driving. The onboard apparatus 2 and the server 3 have a plurality-to-one relationship. The server 3 is capable of performing data communication with a plurality of onboard apparatuses 2.

The onboard apparatus 2 inputs peripheral information related to vehicle periphery, traveling information related to vehicle travel, and position information related to vehicle position from various sensors and various electronic control units (ECUs) mounted in the vehicle. As the peripheral information, the onboard apparatus 2 inputs camera images in a vehicle advancing direction captured by an onboard camera, sensor information from a sensor, such as a millimeter-wave sensor, detecting the vehicle surroundings, radar information from a radar detecting the vehicle surroundings, Light Detection and Ranging/Laser Imaging Detection and Ranging (LiDAR) information from a LiDAR detecting the vehicle surroundings, and the like. The camera images include traffic lights, traffic signs, and signs set on roads, and boundary lines, stop lines at intersections, pedestrian crossings, diamond-shaped markings within intersections, and the like painted on the surfaces of roads. The onboard apparatus 2 is merely required to input at least one of the camera images, the sensor information, the radar information, and the LiDAR information as the peripheral information.

The onboard apparatus 2 inputs vehicle speed information detected by a vehicle speed sensor as the traveling information. As the position information, the onboard apparatus 2 inputs Global Positioning System (GPS) position coordinates obtained by positioning based on GPS signals transmitted from GPS satellites. The GPS position coordinates are coordinates indicating the vehicle position. The satellite positioning system is not limited to GPS, and various Global Navigation Satellite Systems (GNSS), such as Global Navigation Satellite System (GLONASS), Galileo, BeiDou, and Indian Regional Navigation Satellite System (IRNSS), can be used.

The onboard apparatus 2 includes a control unit 5, a data communication unit 6, a probe data storage unit 7, and a map data storage unit 8. The control unit 5 is configured by a microcomputer that has a central processing unit (CPU), a read-only memory (ROM), a random access memory (RAM), and an input/output (I/O). The microcomputer executes a computer program stored in a non-transitory computer-readable (tangible) storage medium, thereby performing a process corresponding to the computer program and controlling the overall operation of the onboard apparatus 2. The microcomputer is identical in meaning to a processor. In the onboard apparatus 2, the non-transitory computer-readable (tangible) storage medium may share hardware with other computer resources. The probe data storage unit 7 and the map data storage unit 8 may be configured mainly by non-transitory computer-readable (tangible) storage media independently provided for respective corresponding data.

The server 3 includes a control unit 9, a data communication unit 10, a probe data storage unit 11, and a map data storage unit 12. The control unit 9 is configured by a microcomputer that has a CPU, a ROM, a RAM, and an I/O. The microcomputer executes a computer program stored in a non-transitory computer-readable (tangible) storage medium, thereby performing a process corresponding to the computer program and controlling the overall operation of the server 3. In the server 3 as well, the non-transitory computer-readable (tangible) storage medium may share hardware with other computer resources. The probe data storage unit 11 and the map data storage unit 12 may be configured mainly by non-transitory computer-readable (tangible) storage media independently provided for respective corresponding data.

In the onboard apparatus 2, when the peripheral information, the traveling information, and the position information are inputted, the control unit 5 generates probe data from the various types of inputted information and stores the generated probe data in the probe data storage unit 7. The probe data is data configured to include the peripheral information, the traveling information, and the position information. The probe data includes data indicating positions, colors, characteristics, relative positional relationships, and the like of traffic lights, traffic signs, signs, boundary lines, stop lines at intersections, pedestrian crossings, diamond-shaped markings within intersections, and the like that are set on the roads. In addition, the probe data also includes data indicating a road shape, road characteristics, a road width, and the like related to a road on which the vehicle is traveling.

For example, with a predetermined amount of time elapsing or a traveling distance of the vehicle reaching a predetermined distance as a trigger, the control unit 5 may read the probe data stored in the probe data storage unit 7 and transmit the read probe data from the data communication unit 6 to the server 3. Instead of the above-described amount of time or traveling distance of the vehicle being the trigger, if the configuration is such that the server 3 transmits a probe data transmission request to the onboard apparatus 2 at a predetermined cycle, the control unit 5 may read the probe data stored in the probe data storage unit 7 and transmit the read probe data from the data communication unit 6 to the server 3 with the data communication unit 6 receiving the probe data transmission request transmitted from the server 3 as the trigger. In addition, for example, at ignition-on, the control unit 5 may transmit the probe data collected during a trip from a previous ignition-on to ignition-off from the data communication unit 6 to the server 3. Alternatively, at ignition-off, the control unit may transmit the probe data collected during a trip from the current ignition-on to ignition-off from the data communication unit 6 to the server 3. When transmitting the probe data from the data communication unit 6 to the server 3, the control unit 5 may transmit the probe data from the data communication unit 6 to the server 3 in segment units, the segment being a unit of an area determined in advance for map management. Alternatively, the control unit 5 may transmit the probe data from the data communication unit 6 to the server 3 in predetermined area units unrelated to the segment unit.

The map data storage unit 8 stores highly accurate map data for actualizing driving assistance. The map data stored in the map data storage unit 8 includes three-dimensional map information, feature information, road attribute value information, and the like. The three-dimensional map information is information including point groups of feature points of road shapes and structures. The feature information is information related to shapes and positions of boundary lines, stop lines at intersections, pedestrian crossings, and diamond-shaped markings within intersections, and the like. The road attribute value information is information related to lanes in the roads, and is information related to a number of lanes, presence/absence of a dedicated right-turn lane, and the like. The map data stored in the map data storage unit 8 is successively updated by the map data stored in the map data storage unit 12 of the server 3, described hereafter, being downloaded from the server 3 to the onboard apparatus 2.

In the server 3, the map data storage unit 12 stores therein highly accurate map data for actualizing driving assistance.

The map data stored in the map data storage unit 12 is data having a larger volume that the map data stored in the map data storage unit 8 of the onboard apparatus 2 and reflects information on a wider area. The control unit 9 receives the probe data transmitted from the onboard apparatus 2 and stores the received probe data in the probe data storage unit 11. The control unit 9 reads the probe data stored in the probe data storage unit 11, reflects the read probe data in the map data stored in the map data storage unit 12, and updates the map data.

A wide variety of road markings, such as boundary lines, stop lines at intersections, pedestrian crossings, and diamond-shaped markings within intersections, are painted on the surfaces of roads. However, as described earlier, a road marking may become blurred over time. For example, when a boundary line becomes blurred and the onboard apparatus 2 is unable to recognize the boundary line, driving assistance, such as autonomous driving, can no longer be appropriately performed. According to the present embodiment, the onboard apparatus 2 and the server 3 are provided with functions described below for the purpose of appropriately reflecting an attribute value indicating the blurring of a road marking in the map data. The functions of the onboard apparatus 2 and the server 3 will be described below. In addition, the boundary line will be described hereafter as an example of the road marking.

In the onboard apparatus 2, the control unit 5 includes a position acquiring unit 5*a*, a determination value acquiring unit 5*b*, a time and date acquiring unit 5*c*, and a transmission data transmitting unit 5*d*. These units 5*a* to 5*d* correspond to a portion of a function performed through a map update program. That is, the control unit 5 provides functions of the units 5*a* to 5*d* by running a portion of the map update program.

The position acquiring unit 5*a* acquires a position of the boundary line painted on the surface of the road by generating the probe data from the peripheral information, the traveling information, and the position information, as described above. For example, the position of the boundary line may be associated with a link ID between nodes.

Figure 2:
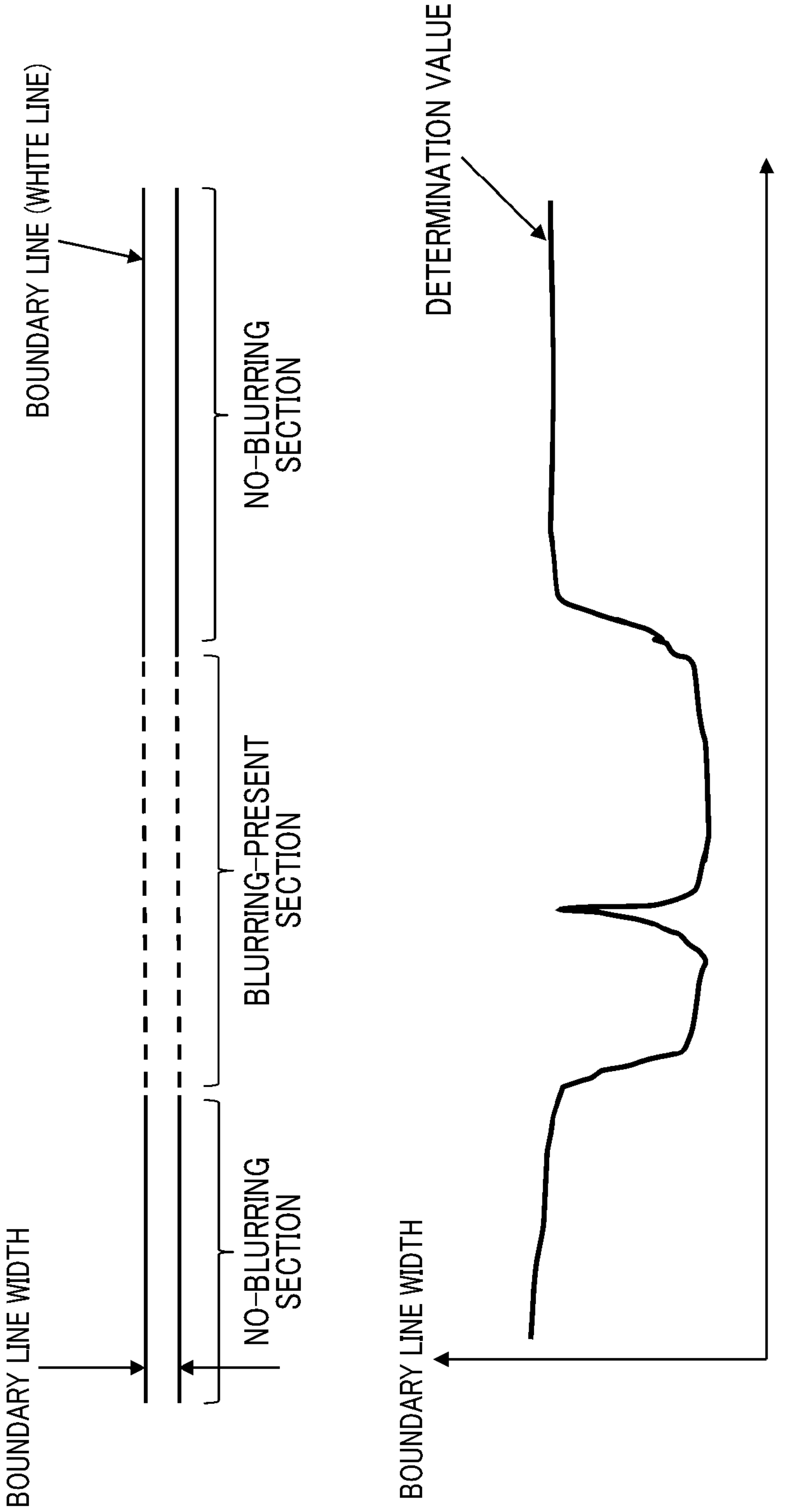
FIG. 2 is a diagram illustrating a boundary line width and a determination value.

The determination value acquiring unit 5*b* acquires a determination value to be subjected to determination of the blurring of the road marking based on measurement information on the road marking and analysis information analyzing the measurement information. As the determination value to be subjected to the determination of the blurring of the boundary line, a boundary line width that is a width of the boundary line itself is acquired. That is, as shown in FIG. 2, with a camera image captured by the onboard camera as the measurement information, for example, the determination value acquiring unit 5*b* may perform image recognition of the boundary line from the camera image and quantify the boundary line width based on the image recognition result. The determination value acquiring unit 5*b* may also quantify the boundary line width based on analysis information analyzing the camera image. In a section in which a degree of blurring of the boundary line is relatively small, the boundary line is clear in the camera image and the image recognition result of the boundary line is favorable. Therefore, a numeric value indicating the image recognition result is relatively high. Meanwhile, in a section in which the degree of blurring of the boundary line is relatively large, the boundary line is unclear in the camera image and the image recognition result of the boundary line is not favorable. Therefore, the numeric value indicating the image recognition result is relatively low.

The date and time acquiring unit 5*c* acquires a date and time at which the determination value acquiring unit 5*b* acquires the determination value.

The transmission data transmitting unit 5*d* associates the position of the boundary line acquired by the position acquiring unit 5*a*, the determination value acquired by the determination value acquiring unit 5*b*, and the date and time acquired by the date and time acquiring unit 5*c*, generates transmission data storing therein the position, the determination value, and the date and time of the boundary line, and transmits the generated transmission data from the data communication unit 6 to the server 3. In this case, the transmission data transmitting unit 5*d* synchronizes the transmission of the transmission data with the transmission of the probe data from the data communication unit 6 to the server 3 by adding the transmission data to the probe data, and transmits the transmission data from the data communication unit 6 to the server 3.

In the server 3, the control unit 9 includes a transmission data receiving unit 9*a*, an information acquiring unit 9*b*, a map data updating unit 9*c*, an information reflecting unit 9*d*, a map data delivering unit 9*e*, and a blur information delivering unit 9*f* The units 9*a* to 9*f* correspond to a portion of a function performed through the map update program. That is, the control unit 9 provides the functions of the units 9*a* to 9*f* by running a portion of the map update program.

The transmission data receiving unit 9*a* receives the transmission data transmitted from the onboard apparatus 2.

Figure 3:
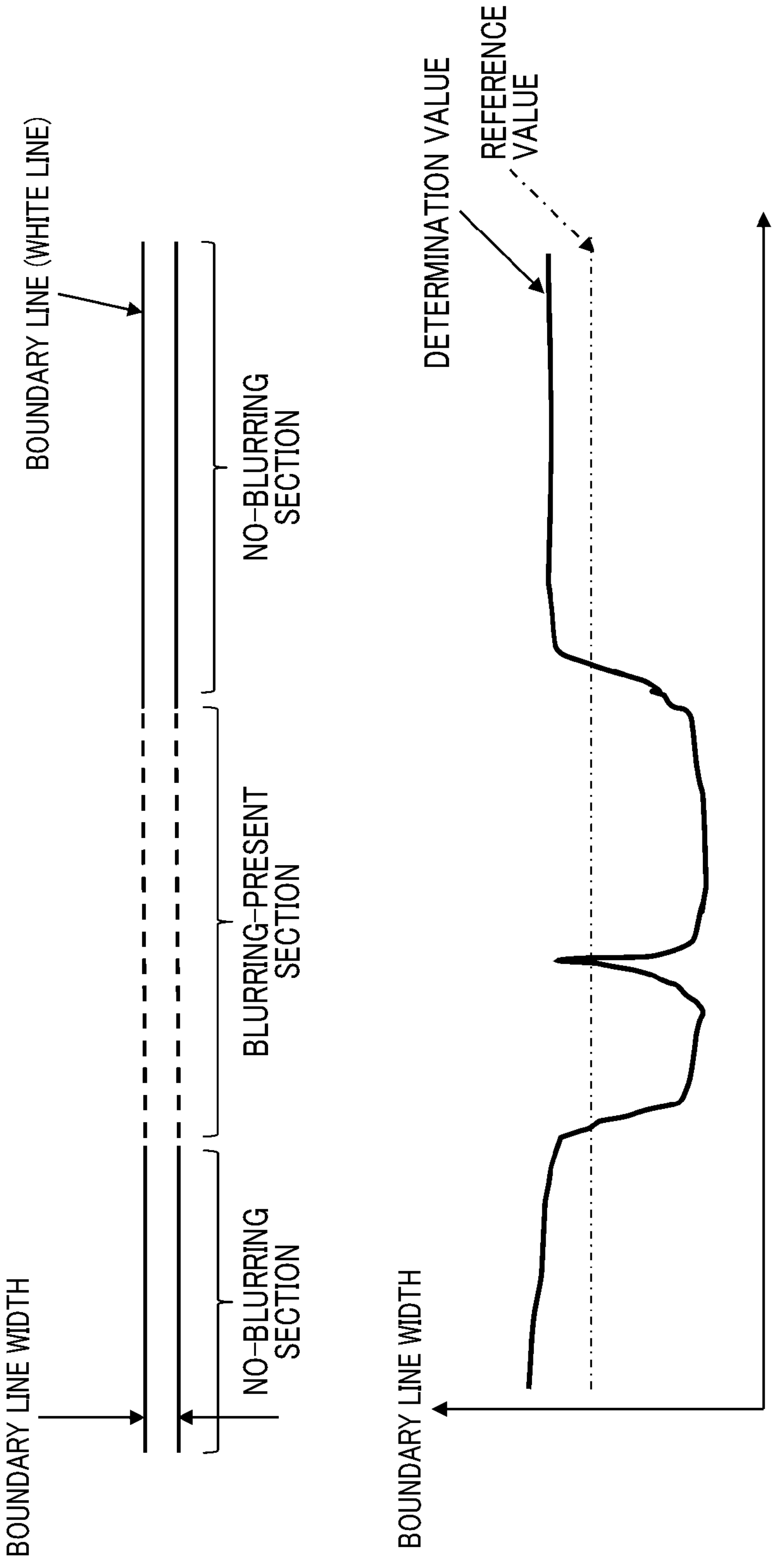
FIG. 3 is a diagram illustrating the determination value and a reference value.

When the transmission data receiving unit 9*a* receives the transmission data transmitted from the onboard apparatus 2, the information acquiring unit 9*b* extracts the position of the boundary line, the determination value, and the date and time from the received transmission data. The information acquiring unit 9*b* compares the determination value extracted from the transmission data to a reference value, acquires blur information indicating the degree of blurring of the boundary line as an attribute value, and temporarily stores the acquired attribute value. That is, as shown in FIG. 3, the information acquiring unit 9*b* compares the determination value to the reference value, determines a section in which the determination value is equal to or greater than the reference value to be "no-blurring", determines a section of which the determination value is less than the reference value to be "blurring-present", and acquires the blur information indicating the determination result as the attribute value. Although there is likelihood of a section in which the determination value is partially equal to or greater than the reference value being present, if the determination value is not continuously equal to or greater than the reference number over a predetermined distance, the information acquiring unit 9*b* determines the section to be "blurring-present".

As a method for comparing the determination value to the reference value, the information acquiring unit 9*b* may use any method such as a method in which the comparison is performed for each point or a method in which a plurality of points are statistically compared in a certain section. The reference value is a value fixedly determined in advance, a value determined through statistical processing in advance of the boundary line width in correspondence to the boundary line width differing with each country or each region, a value determined through statistical processing of real-world values for every section, or the like.

In addition, because an unspecified large number of onboard apparatuses 2 transmit the transmission data together with the probe data to the server 3, the information acquiring unit 9*b* may perform statistical processing on a plurality of attribute values acquired for the same position of the boundary line. By performing statistical processing on the plurality of attribute values, the information acquiring unit 9*b* eliminates a state in which the boundary line is not recognized as a result of, for example, a fallen object being temporarily present on the boundary line. Furthermore, the information acquiring unit 9*b* acquires the date and time information indicating the date and time extracted from the transmission data as the attribute value.

For example, when an update condition for the map data is met by a road being newly laid or removed, the map data updating unit 9*c* may update the map data stored in the map data storage unit 8. Here, the map data updating unit 9*c* may update the map data at a periodic timing even when, for example, a road is not newly laid or removed.

During map data update in which the map data updating unit 9*c* updates the map data, the information reflecting unit 9*d* collates an area to be updated and the position of the boundary line extracted from the transmission data. When the boundary line extracted from the transmission data is determined to be included in the area to be updated, the information reflecting unit 9*d* reflects the attribute value acquired by the information acquiring unit 9*b* for the boundary line in the map data. In this case, as a method for reflecting the attribute value in the map data, the information reflecting unit 9*d* performs either of a method in which a virtual line is set in an area in which the boundary line is blurred and a method in which an index value based on the degree of blurring is set for the area in which the boundary line is blurred.

Figure 4:
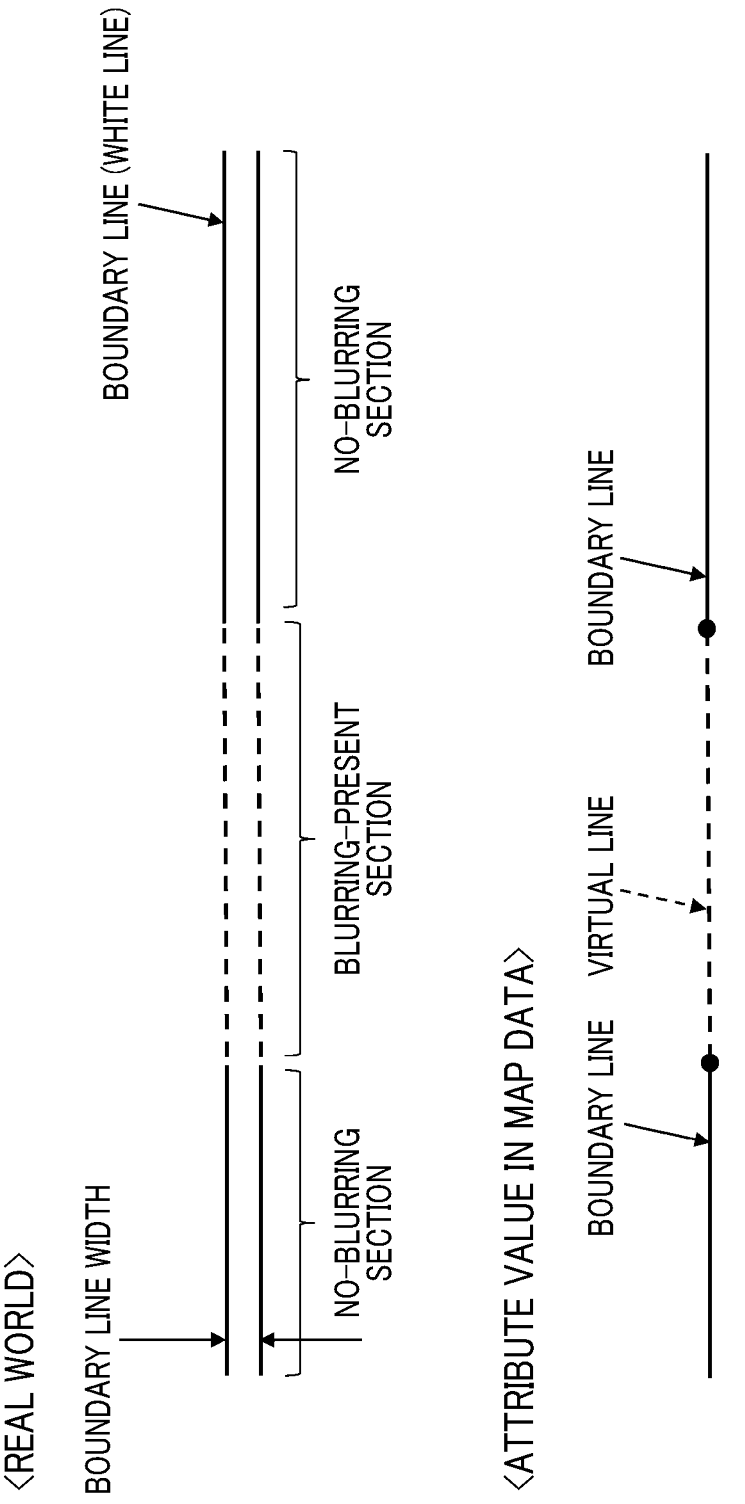
FIG. 4 is a diagram illustrating a virtual line.
Figure 5:
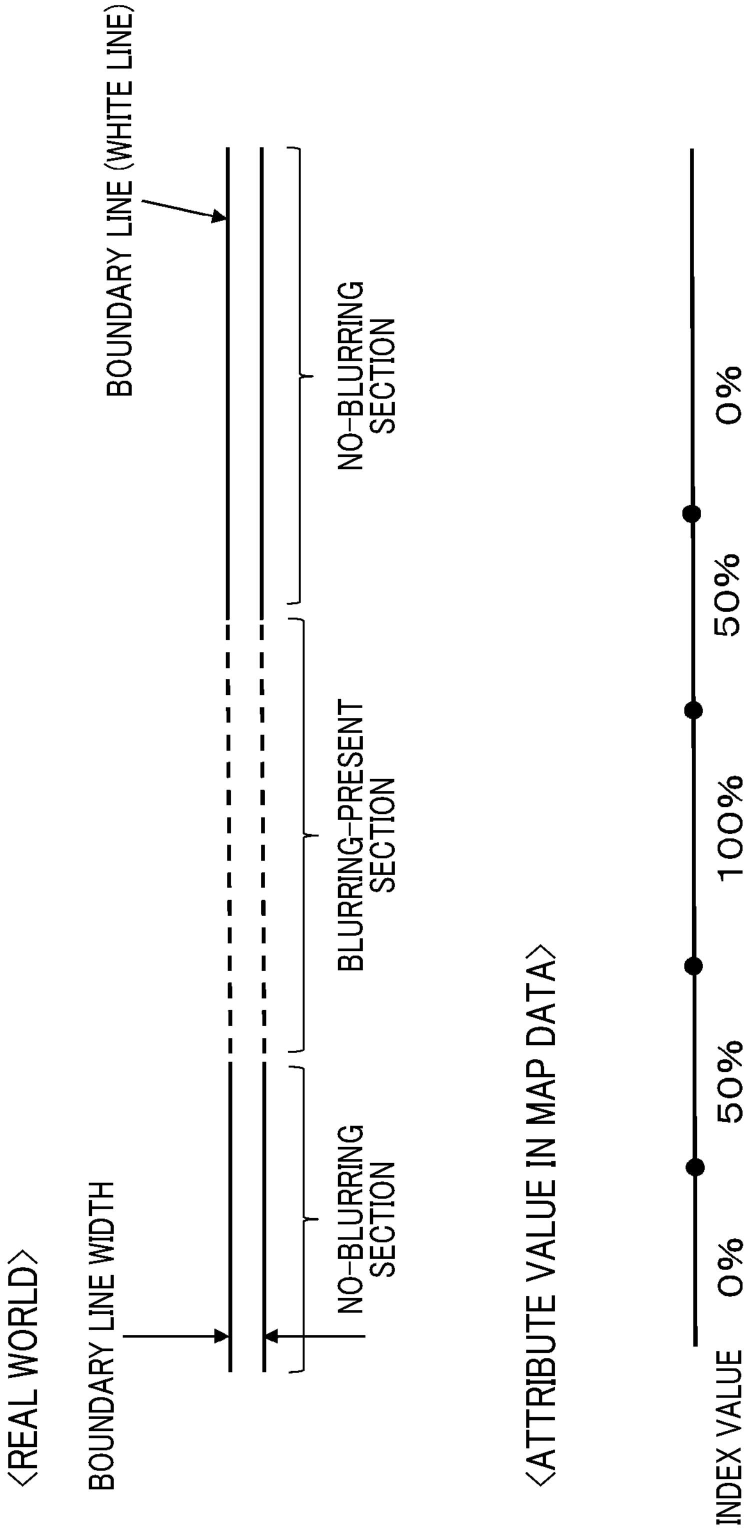
FIG. 5 is a diagram illustrating an index value.
Figure 6:
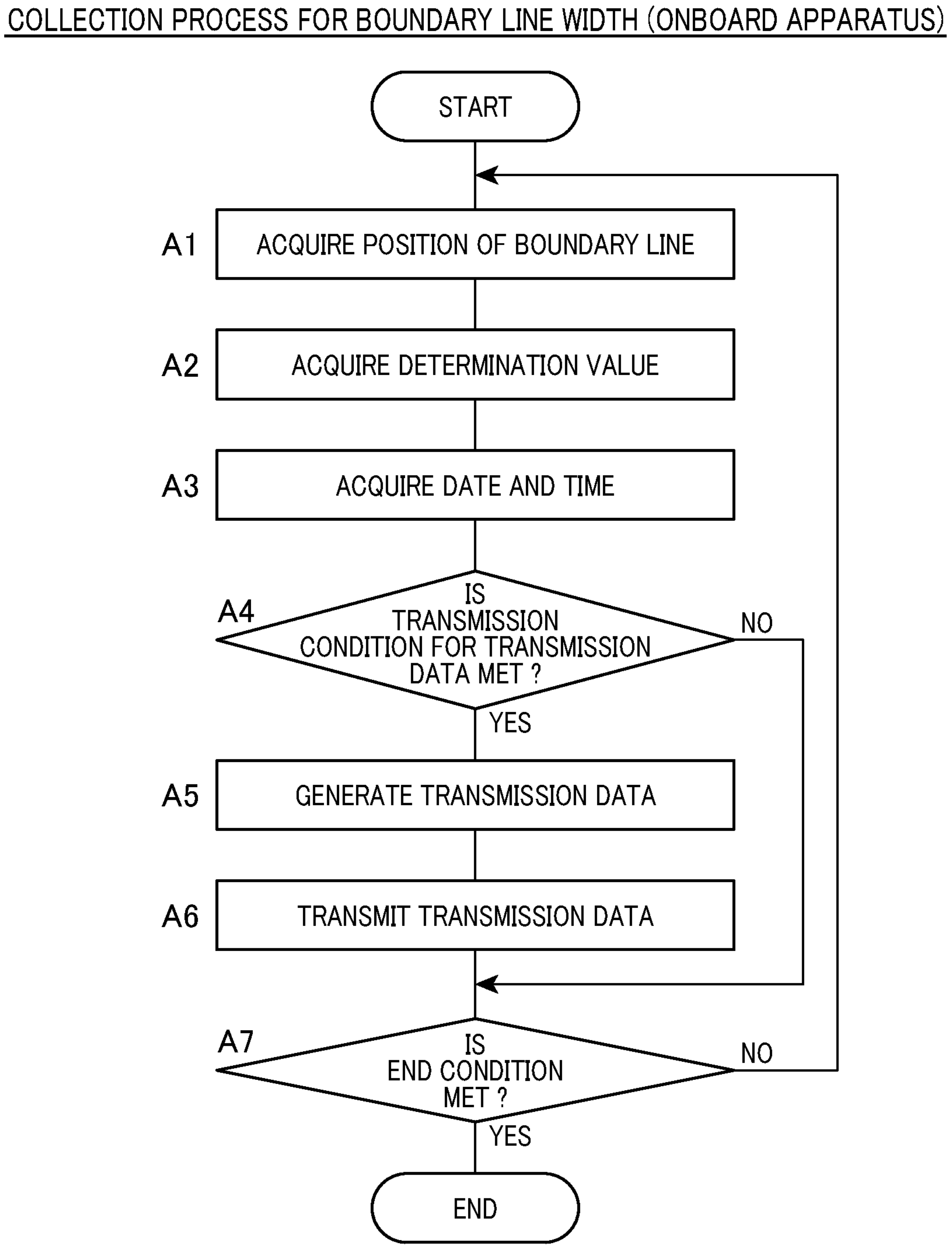
FIG. 6 is a flowchart illustrating a process performed by an onboard apparatus.
Figure 7:
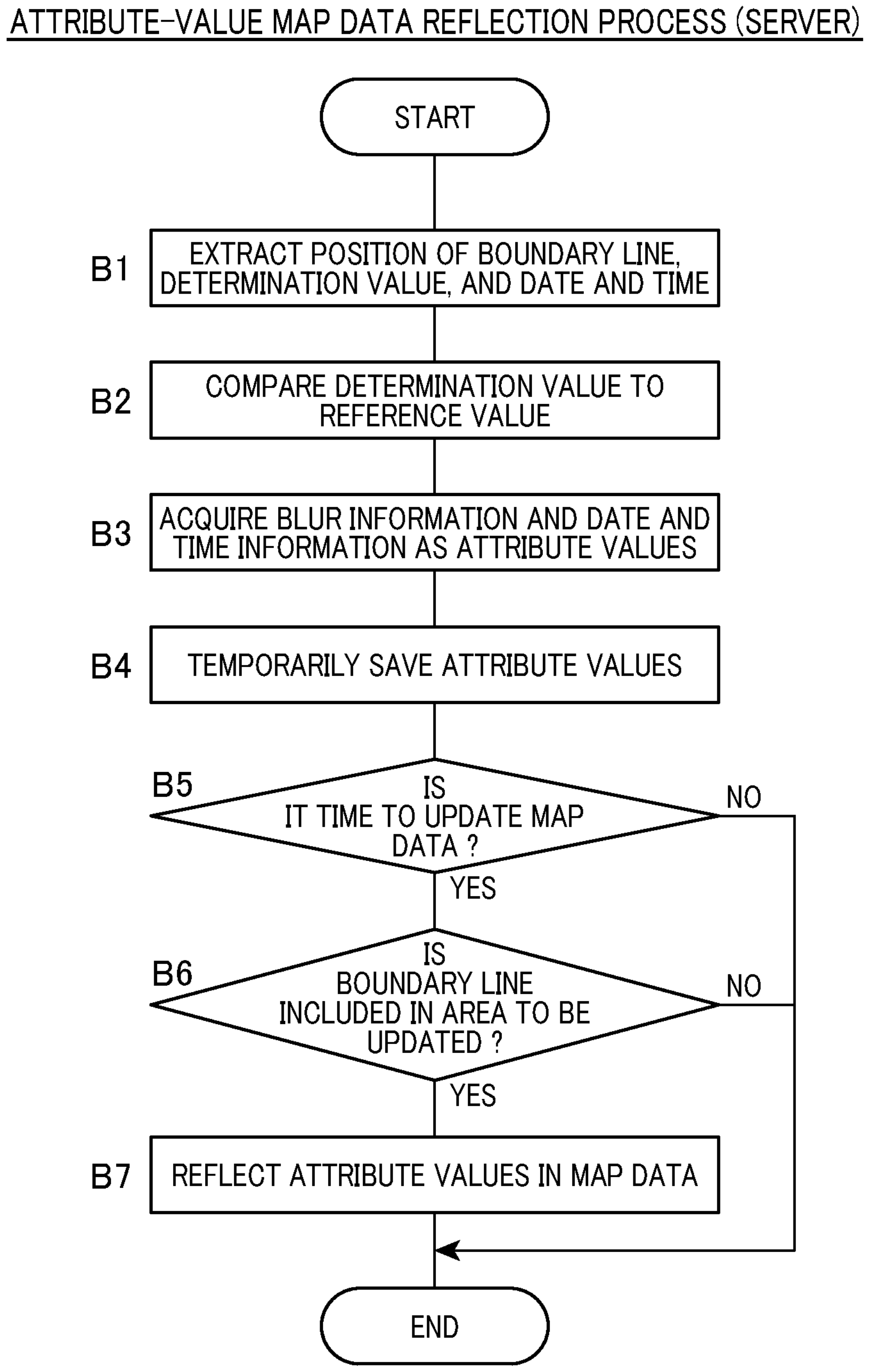
FIG. 7 is a flowchart illustrating a process performed by a server.

In the method in which the virtual line is set in the area in which the boundary line is blurred, as shown in FIG. 4, the information reflecting unit 9*d* keeps the boundary line as is in a section determined by the information acquiring unit 9*b* to be "no-blurring" and sets the virtual line in the section determined by the information acquiring unit 9*b* to be "blurring-present". In the method in which the index value is set for the area in which the boundary line is blurred, as shown in FIG. 5, for example, the information reflecting unit 9*d* may set the index value indicating a proportion of the degree of blurring. For example, the information reflecting unit 9*d* may set the section determined by the information acquiring unit 9*b* to be "no-blurring" to "0%", set the vicinity of the center of the section determined by the information acquiring unit 9*b* to be "blurring-present" to "100%", and set the vicinity of a border between both sections to "50%". Here, the index values are not limited to the three levels, 0%, 50%, and 100%, and may be four levels or greater.

When a delivery condition for the map data is met, the map data delivering unit 9*e* reads the map data from the map data storage unit 12 and delivers the read map data from the data communication unit 10 to the onboard apparatus 2. That is, when the attribute value is reflected in the read map data, the map data delivering unit 9*e* delivers the map data in which the attribute value is reflected from the data communication unit 10 to the onboard apparatus 2. When a delivery condition for blur information is met, the blur information delivering unit 9*f* delivers the blur information from the data communication unit 10 to, for example, an external server. That is, the server 3 not only delivers the map data in which the attribute value is reflected from the data communication unit 10 to the onboard apparatus 2, but also delivers the blur information from the data communication unit 10 to, for example, an external server. For example, the external server may be a server managed by a governmental agency or the like that performs road maintenance. That is, as a result of the blur information being provided, the governmental agency or the like that performs road maintenance can repair the blurred section and perform appropriate road maintenance. In addition, as a result of the map data in which the attribute value is reflected being stored in a storage medium and the map data being read from the storage medium, the attribute value reflected in the map data can be used.

Next, workings of the configuration described above will be described with reference to FIG. 6 to FIG. 10. Here, a process performed by the onboard apparatus 2 and a process performed by the server 3 will be described.

(1) Process Performed by the Onboard Apparatus 2

In the onboard apparatus 2, for example, when a start condition for a collection process for boundary line width in which the boundary line widths are collected is met by ignition-on, the control unit 5 may start the collection process for boundary line width and acquire the position of the boundary line (A1, corresponding to a position acquiring step). The control unit 5 performs image recognition of the boundary line from a camera image, quantifies the boundary line width based on the image recognition result, and acquires the determination value to be subjected to the determination of the blurring of the boundary line (A2, corresponding to a determination value acquiring step). The control unit 5 acquires the date and time at which the determination value is acquired (A3).

The control unit 5 determines whether a transmission condition for transmission data is met (A4). For example, when determined that the transmission condition for transmission data is met by a transmission condition for probe data being met (YES at A4), the control unit may generate the transmission data storing the position of the boundary line, the determination value, and the date and time in association (A5), and transmit the generated transmission data from the data communication unit 6 to the server 3 (A6).

The control unit 5 determines whether an end condition for the collection process for boundary line width is met (A7). When determined that the end condition for the collection process for boundary line width is not met (NO at A7), the control unit 5 returns to step A1 described above, and repeats step A1 and subsequent steps. For example, when the end condition for the collection process for boundary line width is met by ignition-off (YES at A7), the control unit 5 may end the collection process for boundary line width and waits for the start condition for the next collection process for boundary line width to be met.

(2) Process Performed by the Server 3

In the server 3, the control unit 9 performs an attribute-value map data reflection process in which the attribute value is reflected in the map data and the map data delivery process in which the map data is delivered to the onboard apparatus 2. In the server 3, the control unit 9 monitors the reception of the transmission data from the onboard apparatus 2 at a predetermined cycle. When a start condition for the attribute-value map data reflection process is met by the data communication unit 10 receiving the transmission data transmitted from the onboard apparatus 2, the control unit 9 starts the attribute-value map data reflection process, and extracts the position of the boundary line, the determination value, and the date and time from the received transmission data (B1). The control unit 9 compares the determination value to the reference value (B2), acquires the blur information indicating the degree of blurring of the boundary line and the date and time information indicating the date and time as the attribute values (B3, corresponding to an attribute value acquiring step), and temporarily stores the acquired attribute values (B4).

The control unit 9 determines whether it is time to update the map data (B5). When determined that it is time to update the map data (YES at B5), the control unit 9 collates the area to be updated and the position of the boundary line extracted from the transmission data, and determines whether the boundary line extracted from the transmission data is included in the area to be updated (B6). When determined that the boundary line extracted from the transmission data is included in the area to be updated (YES at B6), when the map data is updated, the control unit 9 reflects the attribute values stored for the boundary line from the previous update of the map data to the current update of the map data in the map data, (B7, corresponding to an attribute value reflecting step), ends the attribute-value map data reflection process, and waits for the start condition of the next attribute-value map data reflection process to be met.

Figure 8:
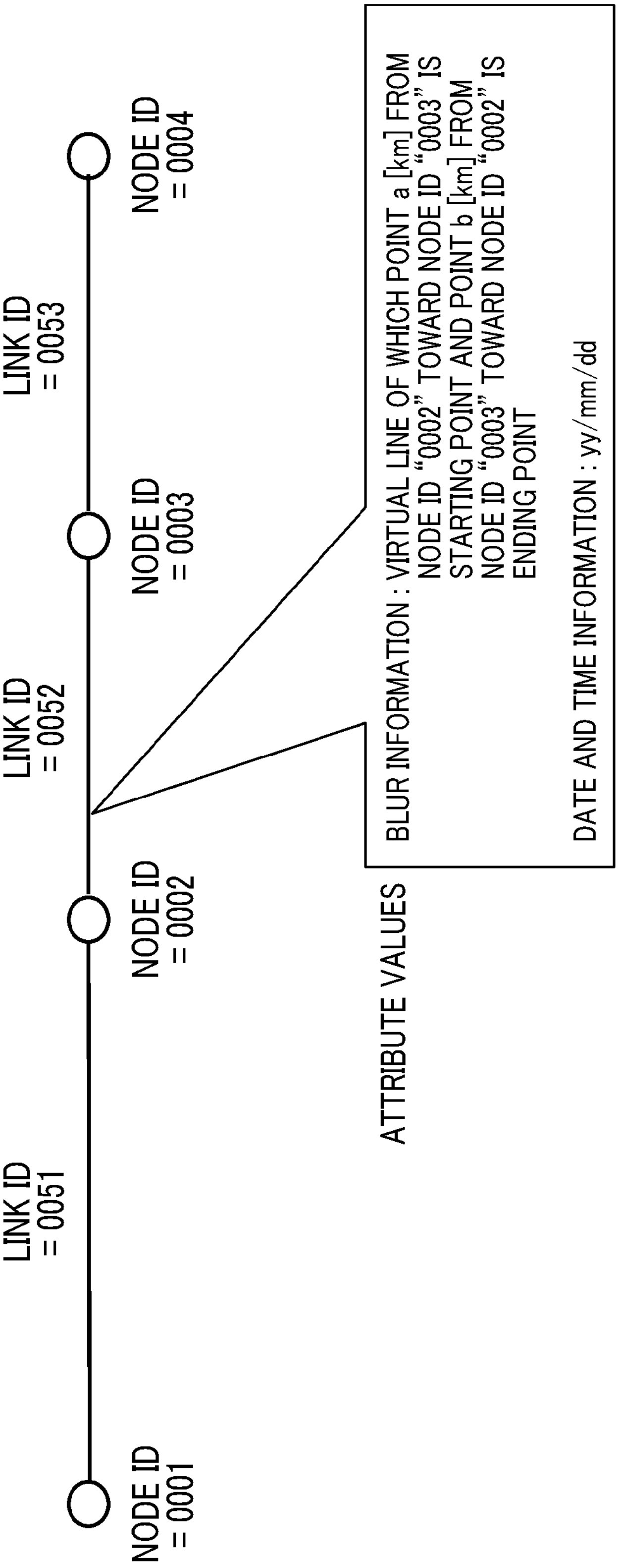
FIG. 8 is a diagram illustrating attribute values.
Figure 9:
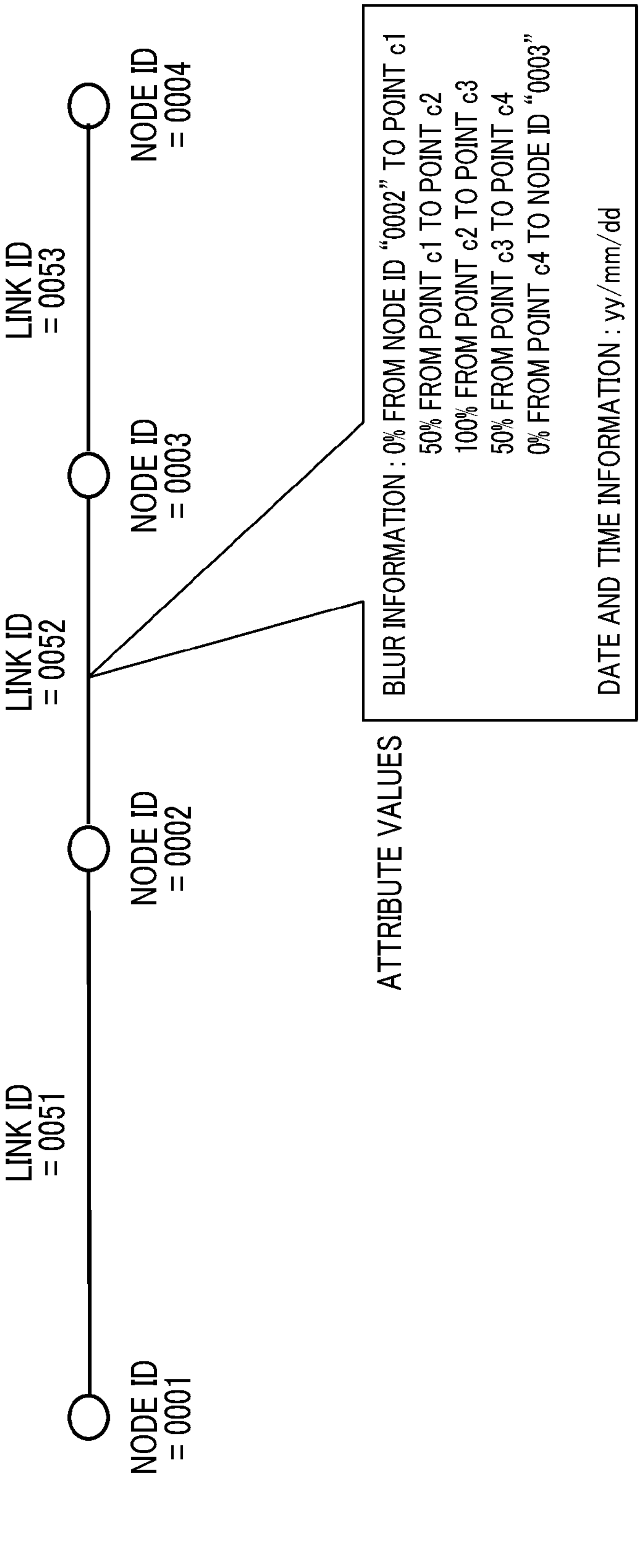
FIG. 9 is a diagram illustrating the attribute values.
Figure 10:
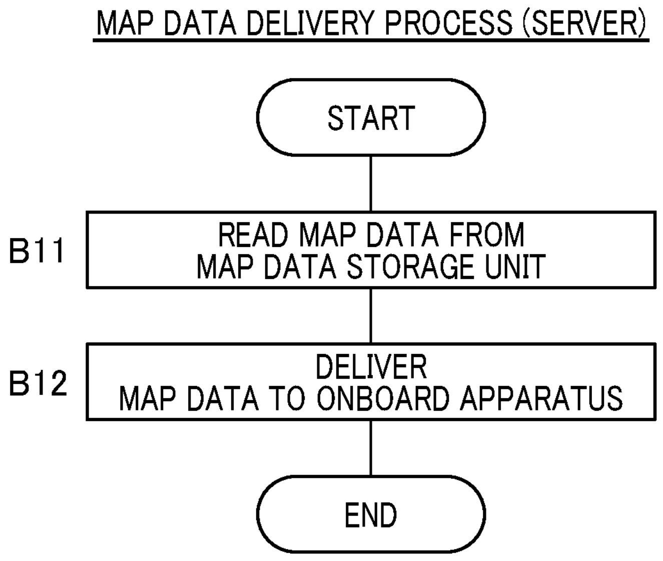
FIG. 10 is a flowchart illustrating a process performed by the server.

As shown in FIG. 8 and FIG. 9, for example, a case in which a section that is "blurring-present" is present in the boundary line of link ID "0052", among link ID "0051 to link ID "0053" from node ID "0001" to node ID "0004", may be assumed. In the method in which the virtual line is set in the area in which the boundary line is blurred, as shown in FIG. 8, the control unit 9 adds the virtual line serving as the blur information and the date and time information as the attribute values to the link having the link ID "0052", and reflects the attribute values in the map data. In this case, for example, the control unit 9 may set the section to which the virtual line is added to be identifiable with reference to a position and a direction of a node. In FIG. 8, the section in which the virtual line is added is set to be identifiable by a point a [km] ahead from the node ID "0002" towards the node ID "0003" being set as a starting point and a point b [km] ahead from the node ID "0003" towards the node ID "0002" being set as an ending point. In addition, for example, the section in which the virtual line is added may be set to be identifiable by a point a [km] ahead from the node ID "0002" towards the node ID "0003" being set as the starting point and a point b' [km] ahead from the starting point being set as the ending point.

In the method in which the index value is set for the area in which the boundary line is blurred, as shown in FIG. 9, the control unit 9 sets the index value serving as the blur information and the date and time information as the attribute values to the link having the link ID "0052", and reflects the attribute values in the map data. In this case as well, for example, the control unit 9 may set the section in which the index value is added to be identifiable with reference to the position and the direction of a node. In FIG. 9, the section in which the index value is added is set to be identifiable by node ID "0002" to node ID "0003" being divided into five sections at four points, c1 to c4.

The control unit 9 monitors the meeting of the delivery condition for the map data at a predetermined cycle. For example, when the start condition for the map data delivery process is met by the data communication unit 10 receiving a transmission request for map data transmitted from the onboard apparatus 2, the control unit 9 may start the map data delivery process and reads, from the map data storage unit 12, the map data on the vicinity of the position of the vehicle in which the onboard apparatus 2 that has transmitted the transmission request for the map data is mounted (B11). The control unit 9 delivers the read map data from the data communication unit 10 to the onboard apparatus 2 (B12), ends the map data delivery process, and waits for the start condition for the next map data delivery process to be met. That is, when the attribute values are reflected in the read map data, the map data delivering unit 9*e* delivers the map data in which the attribute values are reflected from the data communication unit 10 to the onboard apparatus 2.

Subsequently, in the onboard apparatus 2, when the data communication unit 6 receives the map data delivered from the server 3, the control unit 5 performs vehicle control based on the map data. That is, because the attribute values are reflected in the map data, even when the boundary line cannot be recognized in the camera image as a result of the boundary line being blurred, for example, the control unit 5 can perform vehicle control by complementing the blurring based on the attribute values.

Here, as an aspect in which the attribute values are reflected in the map data, an aspect in which either of the virtual line and the index value is added as the attribute value to the link is given as an example. However, both the virtual line and the index value may be added as the attribute values. In addition, an aspect in which the date and time information is added together with the blur information as the attribute values is given as an example. However, an aspect in which the date and time information is omitted and only the blur information is added as the attribute value is also possible.

Furthermore, a case in which the road marking is the boundary line is given as an example. However, the attribute value can be similarly reflected in the map data even in cases in which the road marking is the stop line, the pedestrian crossing, the diamond-shaped marking, or the like.

As described above, according to the first embodiment, the following working effects can be achieved.

In the map update system 1, the determination value that is subject to the determination of the blurring of the boundary line painted on the surface of the road is compared to the reference value, and the blur information indicating the degree of blurring of the boundary line is acquired. The acquired blur information is reflected in the map data. The blurring of the boundary line painted on the surface of the road can be appropriately reflected in the map data.

In addition to the blur information, the date and time information indicating the date and time at which the determination value is acquired is acquired. As a result of the date and time being analyzed, a frequency and a speed of the blurring can be ascertained. Future blurring can be estimated. In addition, as a result of the estimation information being provided to municipalities and road planning and proposal organizations, maintenance can be performed in advance before the boundary line becomes blurred. Furthermore, when the speed of progression of the blurring of the boundary line is fixed, the blurring can be determined to be a result of natural phenomena. Meanwhile, when the boundary line suddenly disappears, the disappearance can be determined to be likely caused deliberately by human action. An appropriate response can be taken, such as an alert being issued and on-site confirmation being conducted.

The virtual line is set in the area in which the boundary line is blurred. The blurring of the boundary line can be managed by data on the virtual line.

The index value based on the degree of blurring is set in the area in which the boundary line is blurred. The blurring of the boundary line can be managed by data on the index value. As a result of the index values being finely set, the degree of blurring can be managed in detail.

Second Embodiment

Figure 11:
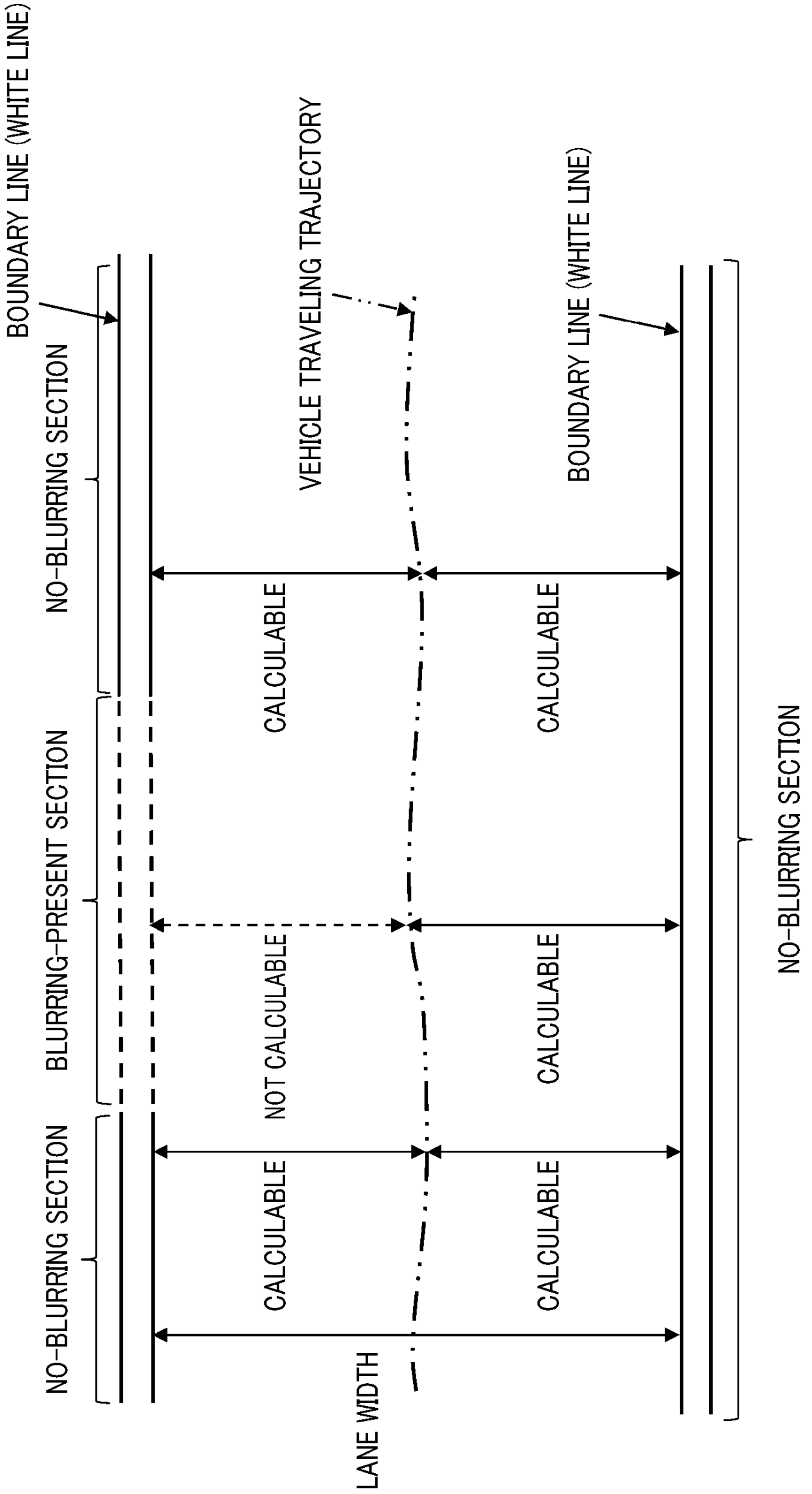
FIG. 11 is diagram illustrating a lane width according to a second embodiment.

A second embodiment will be described with reference to FIG. 11. According to the first embodiment, the configuration is such that the boundary line width is acquired as the determination value. However, according to the second embodiment, the configuration is such that a lane width that is a distance between boundary lines is acquired as the determination value.

In the onboard apparatus 2, the determination value acquiring unit 5*b* acquires the lane width that is the distance between boundary lines as the determination value to be subjected to the determination of the blurring of the boundary line. That is, as shown in FIG. 11, the determination value acquiring unit 5*b* identifies a vehicle traveling trajectory, performs image recognition of the boundary lines on both sides of the vehicle traveling trajectory from a camera image captured by the onboard camera, and calculates the lane width based on the image recognition result. That is, in a section in which the degree of blurring of both boundary lines on both sides is relatively small, both boundary lines on both sides in the camera image are clear and the image recognition result for both boundary lines on both sides is favorable. Therefore, the lane width can be calculated from the image recognition result. Meanwhile, in a section in which the degree of blurring of at least either of the boundary lines on both sides is relatively large, at least either of the boundary lines on both sides in the camera image is unclear. The image recognition result for at least either of the boundary lines on both sides is not favorable. Therefore, the lane width cannot be calculated from the image recognition result.

In the server 3, the information acquiring unit 9*b* determines the section for which the control unit 9 has calculated the lane width to be "no-blurring" and the section for which the control unit 9 has not calculated the lane width to be "blurring-present", and acquires the blur information indicating the determination result as the attribute value. In a manner similar to that according to the first embodiment, during the map data update in which the map data updating unit 9*c* updates the map data, the information reflecting unit 9*d* collates the area to be updated and the position of the boundary line extracted from the transmission data. When the boundary line extracted from the transmission data is determined to be included in the area to be updated, the information reflecting unit 9*d* reflects the attribute value acquired by the information acquiring unit 9*b* for the boundary line in the map data.

According to the second embodiment, as described above, working effects similar to those according to the first embodiment can be achieved. The blurring of the boundary line painted on the surface of the road can be appropriately reflected in the map data.

OTHER EMBODIMENTS

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure. The first embodiment and the second embodiment may be combined. That is, the boundary line width and the lane width may be acquired as the determination values, and a final "no-blurring" or "blurring-present" determination may be made using the respective determination results of "no-blurring" or "blurring-present". For example, a section that is determined to be "blurring-present" in at least either of the determination result for the boundary line width and the determination result for the lane width may be finally determined to be "blurring-present".

The configuration in which image recognition of the boundary line is performed from a camera image is given as an example. However, for example, a configuration in which the boundary line is recognized from the sensor information, the radar information, the LiDAR information, or the like by a reflectance of an optical signal being measured is also possible. In addition, a configuration in which the boundary line is recognized by a combination of these plurality of methods is also possible.

The configuration in which the server 3 performs the process in which the determination value is compared to the reference value and the attribute value is acquired is given as an example. However, a configuration in which the onboard apparatus 2 performs the process in which the determination value is compared to the reference value and the attribute value is acquired by the onboard apparatus 2 holding the reference value is also possible. That is, the process of the onboard apparatus 2 and the process of the server 3 may be assigned in any manner. For example, a configuration in which the server 3 performs the process in which image recognition of the boundary line is performed from a camera image, and the boundary line width and the lane width are quantified by the onboard apparatus 2 transmitting the camera image to the server 3 is also possible.

The control unit and the method thereof described in the present disclosure may be actualized by a dedicated computer that is provided such as to be configured by a processor and a memory, the processor being programmed to provide one or a plurality of functions that are realized by a computer program. Alternatively, the control unit and the method thereof described in the present disclosure may be actualized by a dedicated computer that is provided by a processor being configured by a single dedicated hardware logic circuit or more. Still alternatively, the control unit and the method thereof described in the present disclosure may be actualized by a single dedicated computer or more. The dedicated computer may be configured by a combination of a processor that is programmed to provide one or a plurality of functions, a memory, and a processor that is configured by a single hardware logic circuit or more. In addition, the computer program may be stored in a non-transitory computer-readable (tangible) storage medium that can be read by a computer as instructions performed by the computer.

What is claimed is:

1. A map update system for updating map data stored in a map data storage unit, the map data comprising data to actualize driving assistance, the map update system comprising:

a position acquiring unit that acquires a position of a road marking painted on a surface of a road;

a determination value acquiring unit that acquires a determination value to be subjected to determination of blurring of the road marking based on at least either of measurement information on the road marking and analysis information analyzing the measurement information;

an information acquiring unit that compares the determination value to a reference value and acquires blur information indicating a degree of blurring of the road marking; and an information reflecting unit that reflects the blur information in the map data, wherein:

the map data stored in the map data storage unit includes three-dimensional map information, feature information, and road attribute value information; and the information reflecting unit reflects the blur information in the three-dimensional map information, the feature information, and the road attribute value information included in the map data stored in the map data storage unit by setting a virtual indicator in an area in which the road marking is blurred.

2. The map update system according to claim 1, further comprising:

a date and time acquiring unit that acquires a date and time at which the determination value acquiring unit acquires the determination value, wherein the information acquiring unit acquires date and time information indicating the date and time, in addition to the blur information.

3. The map update system according to claim 1, further comprising:

a map data updating unit that updates the map data stored in the map data storage unit, wherein the information reflecting unit reflects the blur information in the map data during map data update in which the map data updating unit updates the map data.

4. The map update system according to claim 1, further comprising:

an onboard apparatus that is mounted in a vehicle; and a map update apparatus that is capable of performing data communication with the onboard apparatus, wherein the onboard apparatus includes the position acquiring unit and the determination value acquiring unit, and the map update apparatus includes the information acquiring unit and the information reflecting unit.

5. The map update system according to claim 4, wherein:

the determination value acquiring unit acquires the determination value based on an image capturing the road marking by an onboard camera.

6. The map update system according to claim 4, wherein:

the map update apparatus includes a map data delivering unit that delivers the map data in which the blur information is reflected to the onboard apparatus.

7. The map update system according to claim 4, wherein:

the map update apparatus includes a blur information delivering unit that delivers the blur information to a road maintenance organization.

8. The map update system according to claim 1, wherein:

the road marking is a boundary line;

the position acquiring unit acquires a position of the boundary line;

the determination value acquiring unit acquires a determination value to be subjected to determination of blurring of the boundary line; and the information acquiring unit compares the determination value to a reference value and acquires blur information indicating a degree of blurring of the boundary line.

9. The map update system according to claim 8, wherein:

the determination value acquiring unit acquires a boundary line width that is a width of the boundary line itself as the determination value; and the information acquiring unit compares the boundary line width to a reference value and acquires blur information indicating a degree of blurring of the boundary line.

10. The map update system according to claim 8, wherein:

the determination value acquiring unit acquires a lane width that is a distance between boundary lines as the determination value; and the information acquiring unit compares the lane width to a reference value and acquires blur information indicating a degree of blurring of the boundary line.

11. A map update system for updating map data stored in a map data storage unit, the map data comprising data to actualize driving assistance, the map update system comprising:

a position acquiring unit that acquires a position of a road marking painted on a surface of a road;

a determination value acquiring unit that acquires a determination value to be subjected to determination of blurring of the road marking based on at least either of measurement information on the road marking and analysis information analyzing the measurement information;

an information acquiring unit that compares the determination value to a reference value and acquires blur information indicating a degree of blurring of the road marking; and an information reflecting unit that reflects the blur information in the map data, wherein:

the map data stored in the map data storage unit includes three-dimensional map information, feature information, and road attribute value information;

the information acquiring unit acquires the blur information as an attribute value; and the information reflecting unit reflects the attribute value in the three-dimensional map information, the feature information, and the road attribute value information included in the map data stored in the map data storage unit by setting an index value based on a degree of blurring in an area in which the road marking is blurred.

12. The map update system according to claim 11, further comprising:

a date and time acquiring unit that acquires a date and time at which the determination value acquiring unit acquires the determination value, wherein the information acquiring unit acquires date and time information indicating the date and time, in addition to the blur information.

13. The map update system according to claim 11, further comprising:

a map data updating unit that updates the map data stored in the map data storage unit, wherein the information reflecting unit reflects the blur information in the map data during map data update in which the map data updating unit updates the map data.

14. The map update system according to claim 11, further comprising:

an onboard apparatus that is mounted in a vehicle; and a map update apparatus that is capable of performing data communication with the onboard apparatus, wherein the onboard apparatus includes the position acquiring unit and the determination value acquiring unit, and the map update apparatus includes the information acquiring unit and the information reflecting unit.

15. The map update system according to claim 14, wherein:

the determination value acquiring unit acquires the determination value based on an image capturing the road marking by an onboard camera.

16. The map update system according to claim 14, wherein:

the map update apparatus includes a map data delivering unit that delivers the map data in which the blur information is reflected to the onboard apparatus.

17. The map update system according to claim 14, wherein:

the map update apparatus includes a blur information delivering unit that delivers the blur information to a road maintenance organization.

18. The map update system according to claim 11, wherein:

the road marking is a boundary line;

the position acquiring unit acquires a position of the boundary line;

the determination value acquiring unit acquires a determination value to be subjected to determination of blurring of the boundary line; and the information acquiring unit compares the determination value to a reference value and acquires blur information indicating a degree of blurring of the boundary line.

19. A map update apparatus for updating map data stored in a map data storage unit, the map data comprising data to actualize driving assistance, the map update apparatus comprising:

an information acquiring unit that compares a determination value to be subjected to determination of blurring of a road marking painted on a surface of a road to a reference value, and acquires blur information indicating a degree of blurring of the road marking; and an information reflecting unit that reflects the blur information in the map data, wherein:

the map data stored in the map data storage unit includes three-dimensional map information, feature information, and road attribute value information; and the information reflecting unit reflects the blur information in the three-dimensional map information, the feature information, and the road attribute value information included in the map data stored in the map data storage unit by setting a virtual indicator in an area in which the road marking is blurred.

20. A map update apparatus for updating map data stored in a map data storage unit, the map data comprising data to actualize driving assistance, the map update apparatus comprising:

an information acquiring unit that compares a determination value to be subjected to determination of blurring of a road marking painted on a surface of a road to a reference value, and acquires blur information indicating a degree of blurring of the road marking; and an information reflecting unit that reflects the blur information in the map data, wherein:

the map data stored in the map data storage unit includes three-dimensional map information, feature information, and road attribute value information;

the information acquiring unit acquires the blur information as an attribute value; and the information reflecting unit reflects the attribute value in the three-dimensional map information, the feature information, and the road attribute value information included in the map data stored in the map data storage unit by setting an index value based on a degree of blurring in an area in which the road marking is blurred.

* * * * *